(12) United States Patent
Noll

(10) Patent No.: US 6,450,656 B1
(45) Date of Patent: Sep. 17, 2002

(54) DISPLAY UNIT

(75) Inventor: Heinrich Noll, Gross-Umstadt (DE)

(73) Assignee: Mannesmann VDO AG, Frankfurt (DE)

( * ) Notice: Subject to any disclaimer, the term of this patent is extended or adjusted under 35 U.S.C. 154(b) by 0 days.

(21) Appl. No.: 09/461,549

(22) Filed: Dec. 14, 1999

(30) Foreign Application Priority Data

Dec. 15, 1998 (DE) .......................................... 198 57 862

(51) Int. Cl.$^7$ ............................................... G01D 11/28
(52) U.S. Cl. ............................... 362/23; 362/26; 362/27
(58) Field of Search ............................... 362/23, 26, 27, 362/29, 30; 116/286, 310, DIG. 5, DIG. 36

(56) References Cited

U.S. PATENT DOCUMENTS

| | | | | | |
|---|---|---|---|---|---|
| 5,268,823 A | * | 12/1993 | Yergenson | ..................... | 362/26 |
| 5,915,822 A | * | 6/1999 | Ogura et al. | ................... | 362/23 |
| 5,971,558 A | * | 10/1999 | Peel | ............................. | 362/26 |

FOREIGN PATENT DOCUMENTS

DE 2944537 5/1980

* cited by examiner

*Primary Examiner*—Y. My Quach-Lee
(74) *Attorney, Agent, or Firm*—Martin A. Farber

(57) ABSTRACT

In a display unit (1), an approximately annular optical conductor (6) rises helically from a set back plane up to a dial (2). At the same time, the cross-sectional surface of the optical conductor (6) decreases from a section (8) inclined toward a light source (7) shining into the optical conductor (6) to a section (9) inclined toward the dial (2). As a result, the light beams strike the boundary surfaces of the optical conductor (6) at an angle which becomes steeper and steeper, so that an increasing portion of the relayed light is coupled out of the optical conductor (6) and thus also ensures an adequate brightness at the section (9) inclined away from the light source (7). At the same time, differences in brightness are evened out so that even scratches and soiling of the optical conductor (6) are invisible to a viewer.

35 Claims, 2 Drawing Sheets

DISPLAY UNIT

FIELD AND BACKGROUND OF THE INVENTION

The invention relates to a display unit, in particular for a motor vehicle, having a light source radiating into an optical conductor, in particular for backlighting of a transparent dial.

Display units of the above type are used, for example, as tachometers or pedometers in present-day motor vehicles and are generally known. The dial of such a display unit has markings in the form of numbers, symbols or scale marks which stand out from the remaining regions by their transparency or their coloring. This dial consists, for example, of a colored, preponderantly transparent film which is applied to the optical conductor. A lamp is arranged as light source behind the optical conductor. The lamp is used to launch into the optical conductor light which reaches a viewer through the dial.

It is disadvantageous in such a display unit that the dial regions adjacent to the light source are more strongly transilluminated than regions more remote from it. The dial is therefore transilluminated non-uniformly, with the result that, for example, the light source can be detected through the dial at a bright spot by the viewer and thus hinders readability. In practice, this disadvantageous is at least partially offset by a multiplicity of light sources arranged as uniformly as possible. In this case, the high outlay associated therewith, and the substantial space requirement are disadvantageous.

Furthermore, it is seen as disadvantageous in the case of such display units that even the smallest amount of damage, irregularities or soiling of the optical conductor become visible on the dial to the viewer. Soiling necessitates troublesome cleaning of the display unit. Furthermore, means for fixing the optical conductor on the dial can lead to formation of shadows which likewise have to be evened out.

SUMMARY OF THE INVENTION

The invention is based on the problem of configuring a display unit of the type mentioned at the beginning such that the dial can be lit with the smallest possible outlay without differences in brightness visible to a viewer.

This problem is solved according to the invention by virtue of the fact that the optical conductor is arranged essentially in a plane inclined with respect to the dial, the light source shining into a section of the optical conductor inclined away from the dial. As a result, a portion of the light led into the optical conductor is coupled out at its boundary surface, and the remaining portion of the light is guided inside the optical conductor further in the direction of the dial. In this case, a relatively large portion of the light emerges at the section of the optical conductor which is inclined toward the light source and is spaced relatively far from the dial, while a decreasing portion of the light emerges at a reduced spacing from the dial. The impression of brightness is thereby evened out for the viewer over the entire surface of the dial. In particular, in this case a light source shining into a section of the optical conductor suffices to enable a comparatively simple design to be achieved, which at the same time can be produced with a low outlay. Put simply, the optical conductor can be considered, on the one hand, as an optical conductor and, on the other hand, like an obliquely positioned mirror as reflector. Furthermore, damage or dirt particles on the outside of the optical conductor remain largely invisible to a viewer. Again, the uniform and bright emission of light also renders it possible to realize dials with a so-called positive representation, in the case of which dark, opaque numerals are arranged on the transparent, bright dial, so that the lighting of a pointer can be eliminated.

In this case, a particularly advantageous embodiment of the invention results from the fact that the optical conductor has a cross-sectional surface decreasing from a section of the optical conductor inclined toward the light source to a section of the optical conductor inclined toward the dial. Due to this essentially wedge-shaped form of the optical conductor, the light led into it strikes the boundary surface of the optical conductor at an increasingly steeper angle, as a result of which the reflection is reduced and an increasing portion of the light emerges from the optical conductor. It is thereby possible to achieve a quantity of light emerging uniformly over the entire length of the optical conductor, and thus optimum lighting of the dial.

A particularly useful development of the invention is also achieved when the optical conductor has a light outcoupling surface designed as a structured surface. It is possible by means of such a configuration of the outer surface to achieve pinpointed outcoupling of the light in a desired region. It is thereby also possible for specific subregions of the surface to be lit to be optically emphasized. The structured surface can be arranged in this case both on an outer surface of the optical conductor inclined toward the dial, and on an outer surface of the optical conductor inclined away from the dial. The structured surface can consist for this purpose of depressions, for example notches of different dimensions, a rough surface, a printed surface or a mat surface. In particular, the light outcoupling surface can also comprise a combination of differently structured surfaces, in order thus to achieve a different emergence of light in different sections of the optical conductor.

A development of the invention which is likewise particularly expedient is achieved by virtue of the fact that the optical conductor has at least one boundary surface which runs in its cross section and has an altered transmission. This boundary surface causes an intensified emergence of the incident light, thus achieving a brightness of a respective subregion which can be reliably determined in advance. Such boundary surfaces can be arranged for this purpose at a different spacing from one another which, in particular, can be made to be smaller in the region inclined toward the surface to be lit, with the result that a correspondingly increasing portion of the light led in is coupled out.

The optical conductor could have a cutout for guiding through a pointer shaft. A particularly favorable embodiment of the invention is, by contrast, also achieved by virtue of the fact that the optical conductor runs approximately helically from a plane set back from the dial to the plane of the dial. It is possible as a result to light a dial, for example an annular one, without differences in brightness, the pointer shaft being arranged in the central region, and the guidance of the light not being hindered thereby.

It is also particularly advantageous when the optical conductor bears against the dial with its section averted from the light source. As a result, the light can be led directly into the dial so that, on the one hand, it is possible to achieve a further increase in the brightness of the dial lit in such a way. On the other hand, the light for lighting further displays can be relayed to the display unit.

One embodiment of the invention is particularly useful by virtue of the fact that the light source is arranged on a printed circuit board together with the section of the optical conductor inclined toward the light source. As a result, the mounting operation can be substantially simplified, and thus a space-saving configuration can be achieved at the same time. For this purpose, the light source makes contact with the printed circuit board and shines directly into the optical conductor.

It is particularly favorable in this case when the section of the printed circuit board spanned by the optical conductor is provided for the arrangement of further electric components. As a result, the space available below the optical conductor can be optimally used, and thus the overall size of the display unit can be reduced.

An advantageous development of the invention is also achieved by virtue of the fact that the optical conductor has a middle section inclined toward the dial and two end sections inclined away from the dial into which one light source shines in each case. As a result, it is possible simultaneously to achieve a stable configuration of the optical conductor which is easy to mount, and to increase the lighting intensity which can be achieved by means of the optical conductor. It is also possible in this case to use light sources with a different color in order, for example, to emphasize a subregion of the dial optically, or to represent the achievement of a critical value of the display unit in a signal color.

It is also particularly expedient in this case when the optical conductor is provided with a reflecting element on an outer surface averted from the dial. This reflecting element prevents the undesired emergence of light at an outer surface averted from the dial, in particular the underside of the optical conductor, and thereby reduces the losses. For this purpose, the reflecting element can be designed, for example, only as a reflecting coating applied to the underside of the optical conductor, or as a reflector which is connected to the dial and encloses the optical conductor.

A particularly advantageous development of the invention is achieved in this case by virtue of the fact that the light source is a light-emitting diode (LED). A form of the display unit which simultaneously saves energy and can be produced without any problem is thereby realized. The light-emitting diode can be designed for this purpose preferably as a component (SMD) which can be surface-mounted, with the result that the mounting process can be further simplified.

Detouring the light, and thus reducing the light yield, when launching it into the optical conductor can be avoided when the direction of emission of the light source is not vertical, but approximately parallel to the printed circuit board. It is particularly favorable when the light source is designed for emitting the light in a fashion directed obliquely upward. As a result, light emanating from the light-emitting diode can shine in directly in the direction of the optical conductor arranged obliquely between the plane of the dial and the printed circuit board running parallel thereto. Further optical components for deflecting the light are therefore not required, with the result that no losses occur, or only slight ones. For this purpose, the light-emitting diode can, for example, also bear directly against the optical conductor and thus permit light launching which is further improved.

Another particularly useful embodiment of the invention is also achieved by virtue of the fact that in addition to the first light source the display unit has at least one further light source of different color. It is possible as a result to represent the change in the color of the surface lit by means of the optical conductor. For example, this change in color can be performed when a specific pointer position of the display unit is reached, and the associated value can thereby be emphasized optically. In the same way, the change in color can also be performed by means of a multicolored light-emitting diode which emits light with a different color spectrum depending on how it is driven.

Also particularly useful is a development of the invention in which the dial and a liquid crystal display (LCD) arranged approximately in the plane of the dial can be lit simultaneously by means of the optical conductor. As a result, it is possible to eliminate a separate light source for the liquid crystal display. At the same time, the free space below the optical conductor can be used for a controller, in particular a driver of the liquid crystal display.

BRIEF DESCRIPTION OF THE DRAWINGS

The invention permits various embodiments. In order to illustrate its fundamental principle, three of these are represented in the drawings and are explained below. In the drawings.

DETAILED DESCRIPTION OF THE PREFERRED EMBODIMENT

Figure 1:
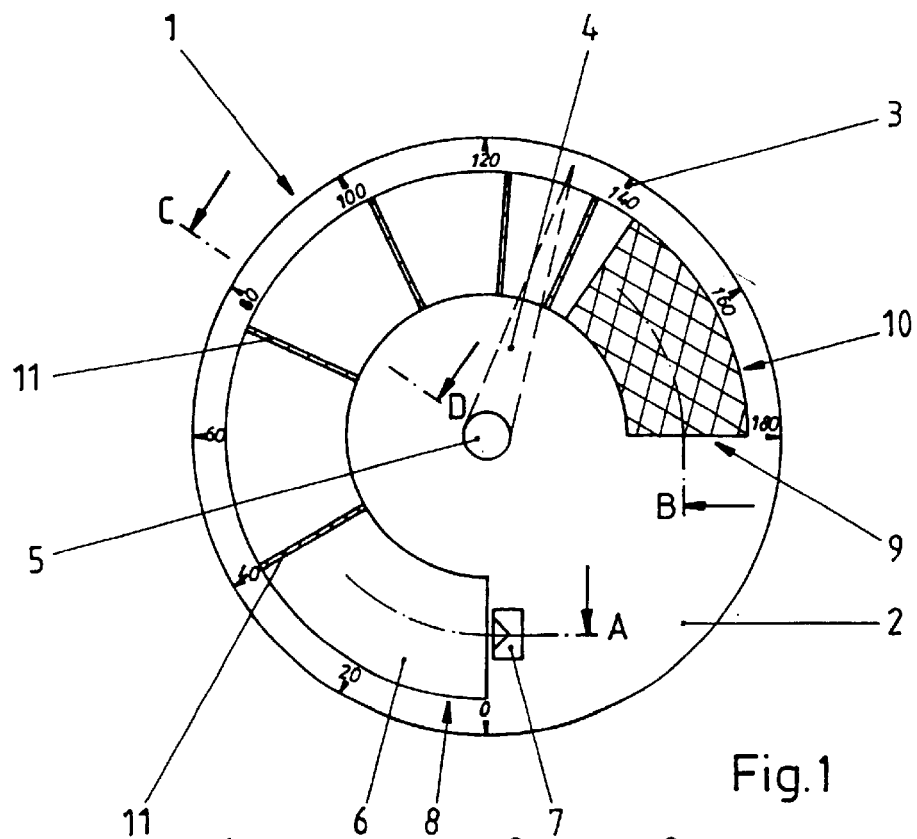
FIG. 1 shows a plan view of a display unit according to the invention having a transparent dial and an optical conductor.

FIG. 1 shows in a plan view a display unit 1 according to the invention having an essentially transparent dial 2 which bears a scale 3 on the outside. A pointer 4 (represented only by dashes) of the display unit 1 is arranged pivotably on a pointer shaft 5. Visible through the transparent dial 2 is an optical conductor 6 which is shaped approximately as a ¾ annulus. The optical conductor 6 has a section 8 inclined toward a light source 7 and into which the light source 7, designed as a light-emitting diode, shines directly. The optical conductor 6 rises approximately helically from a plane of the light source 7 set back from the dial 2, and bears from below against the dial 2 with a section 9 inclined away from the light source 7. The optical conductor 6 has a light outcoupling surface 10, the surface 10 facing the dial 2 for coupling light outward from the surface 10 and into the dial 2, and which is inclined toward the dial 2 and designed as a structured surface and permits a uniformly bright light outcoupling, as well as a plurality of boundary surfaces 11, the surfaces 11 facing the dial 2 for coupling light outward from the respective surfaces 11 toward the dial 2, and which run in the cross section of the optical conductor 6 and likewise promote pinpointed outcoupling of the light from the optical conductor 6.

As a result of this design of the display unit 1, a simultaneously uniformly bright and compact design is achieved which also manages with only one light source 7. Differences in brightness are not visible to a viewer of the display unit 1.

Figure 2:
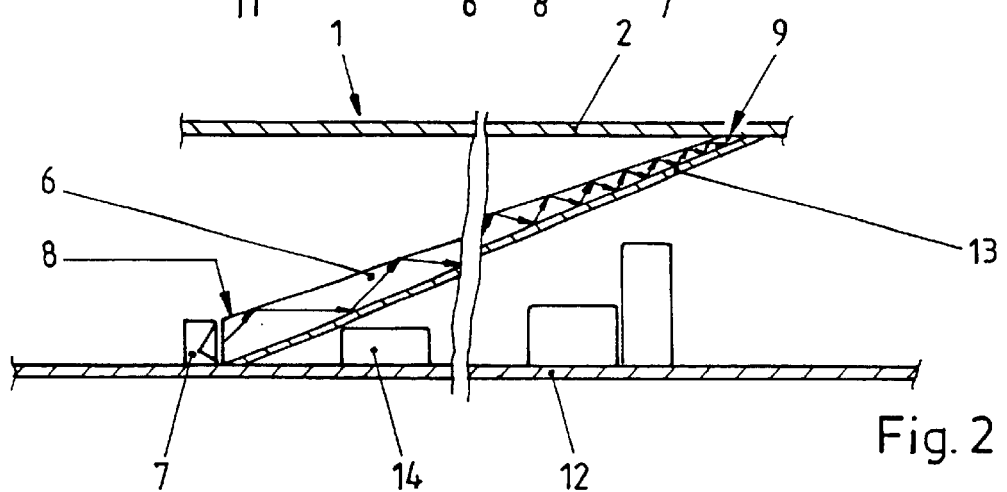
FIG. 2 shows a representation of the display unit cut along the line A–B.

FIG. 2 shows a side view, cut along the line A–B, of the display unit 1. It represents the optical conductor 6, which is connected to a printed circuit board 12 and into whose section 8 the light source 7, designed as a light-emitting diode, shines. The optical conductor 6 extends from the plane of the printed circuit board 12 obliquely upward, and bears with its section 9 against the underside of the dial 2. The optical conductor 6 is provided with a reflecting element 13 on its side inclined away from the dial 2, thus preventing light from being coupled out on this side of the optical conductor 6. The optical conductor 6 has a cross-sectional surface which decreases from its first section 8 to the section 9, with the result that, as is represented by way of example for a possible beam path, the light launched by means of the light source 7 strikes the outer surface of the optical conductor 6 or the reflecting element 13 at an increasingly steeper angle. Consequently, an increasing portion of the light is coupled out of the optical conductor 6. Differences in brightness caused by the different distances covered by the light, respectively coupled out of the optical conductor 6, until it strikes the dial 2 are thereby evened out. In this case, damage or soiling of the outer surface of the optical conductor 6 remains invisible to a viewer of the dial 2. At the same time, the space bounded by the optical conductor 6 and the printed circuit board 12 can be used for further electronic or electric components 14, and thereby permits a compact design.

Figure 3:
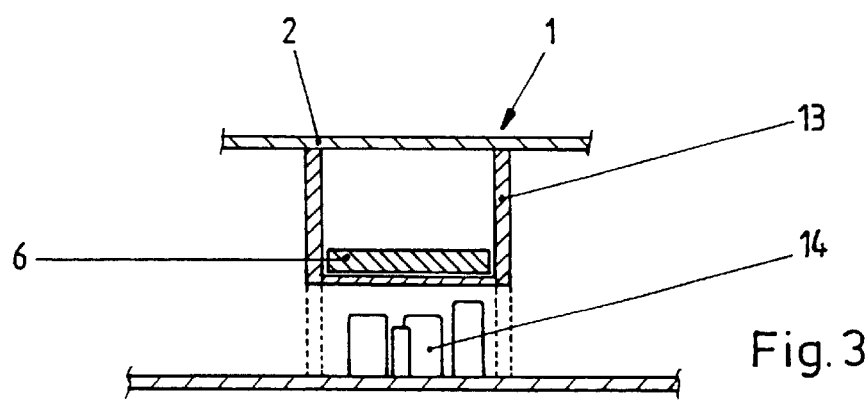
FIG. 3 shows a representation of the display unit cut along the line C–D.

FIG. 3 represents the display unit 1 cut along the line C–D. It shows the reflecting element 13, which is designed as a reflector channel, bears against the dial 2 and encloses the optical conductor 6 and in this case supports both the dial 2 and the optical conductor 6. Possible losses in brightness are thereby minimized. At the same time, electric components 14 can be arranged on the printed circuit board 12 below the reflecting element 13, and the space available can be used optimally. In this case, the efficiency is so high that a single light source designed as a light-emitting diode suffices to light the dial 2.

Figure 4:
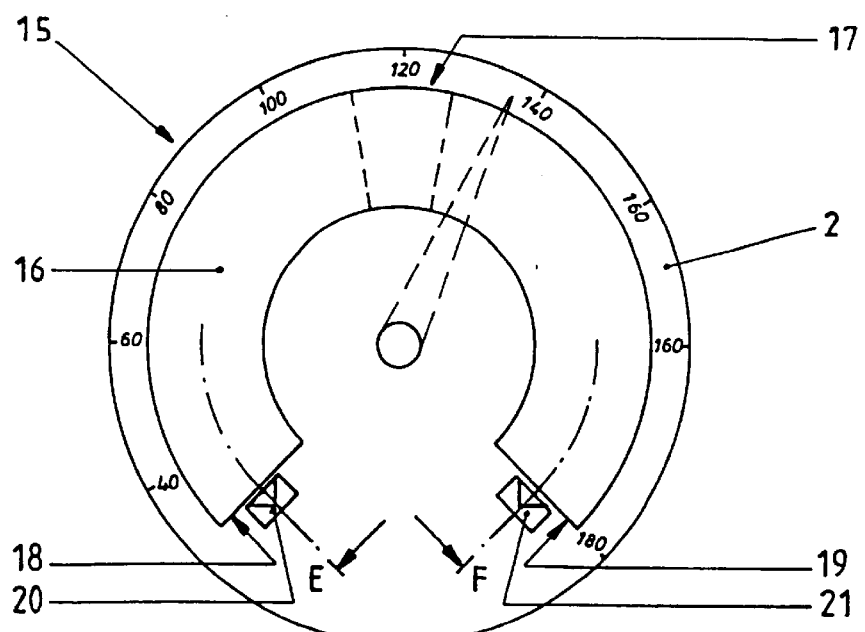
FIG. 4 shows a plan view of a display unit having two light sources.

FIG. 4 shows an embodiment of a display unit 15 in plan view in a form modified by comparison with FIG. 1. It represents the optical conductor 16 of the display unit 15 with a middle section 17 bearing against the underside of the dial 2, and two end sections 18, 19 which are set back from the plane of the dial 2. Shining respectively into the end sections 18, 19 are light sources 20, 21 which are designed as light-emitting diodes and can in this case also have different colors, for example, in order to emphasize an arbitrary region of the dial 2 optically. The display unit 15 therefore has an overall height which is reduced by comparison with the embodiment represented in FIG. 1, and thus permits a particularly space-saving arrangement in a dashboard (not represented) of a motor vehicle.

Figure 5:
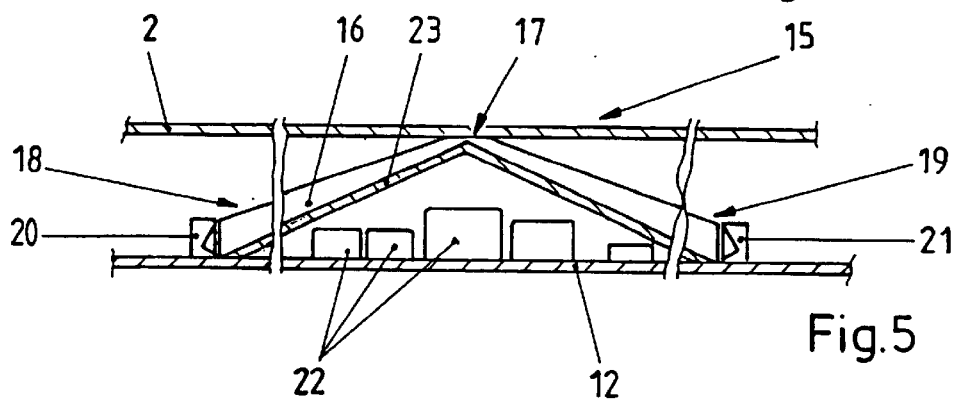
FIG. 5 shows a representation of the display unit shown in FIG. 4, cut along the line E–F.

The display unit 15 shown in FIG. 4 is represented in FIG. 5 cut along the line E–F. To be seen is the bridge-like configuration of the optical conductor 16, whose end sections 18, 19 are arranged on the printed circuit board 12 and into which one of the two light sources 20, 21 respectively shines. The optical conductor 16 in this case spans a plurality of electric components 22 which are arranged on the printed circuit board 12 and are likewise arranged on the printed circuit board 12 (represented only partly). The underside of the optical conductor 16 is provided with a reflecting element 23 which prevents light from being coupled out downward undesirably. The middle section 17 of the optical conductor 16 bears against the underside of the dial 2. Furthermore, the optical conductor 16 has a cross-sectional surface which, similar to the embodiment shown in FIG. 2, decreases toward the middle section 17, thus ensuring light is coupled out in a uniformly bright fashion. Furthermore, the optical conductor 16 can also have surfaces (not represented) which are structured or mat.

Figure 6:
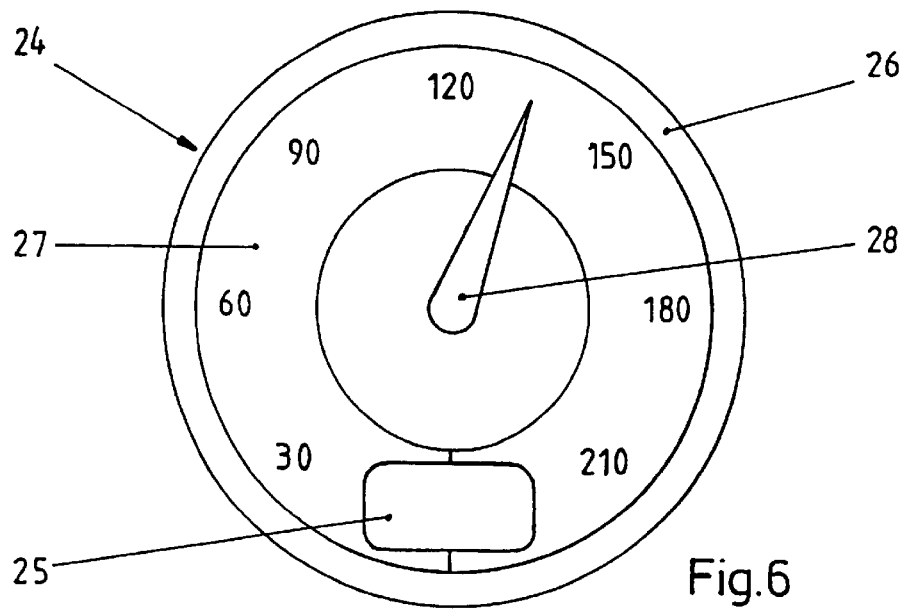
FIG. 6 shows a plan view of a display unit having a liquid crystal display (LCD).

FIG. 6 shows a plan view of a display unit 24 having a liquid crystal display (LCD) 25. An optical conductor 27, shining through a dial 26, is to be seen here as a complete annulus, and so the emitted light can be used simultaneously for backlighting of the liquid crystal display 25. Because of the uniformly high brightness, it is possible to image the numerals of the dial 26 in a so-called positive representation, in which the numerals are arranged on the bright dial 26 in a fashion which is opaque and dark. In this case, a pointer flag 28 of the display unit 24 is opaque and unlit, thus simultaneously also permitting an attractive optical appearance in addition to simplicity of production.

I claim:

1. A display unit, in particular for a motor vehicle, having a light source radiating light into an optical conductor, in particular for backlighting of a transparent dial, the light source being spaced apart from the dial, the optical conductor having a first section located at the light source and a second section located at the dial, wherein the optical conductor comprises a third section inclined with respect to the dial and extending from the first section to the second section, the light source shining light into the first section of the optical conductor, wherein the optical conductor has a light outcoupling surface formed as a structured surface.

2. The display unit as claimed in claim 1, wherein the optical conductor has a cross-sectional surface decreasing from the first section of the optical conductor to the second section of the optical conductor.

3. The display unit as claimed in claim 1, wherein the optical conductor bears against the dial with its second section inclined away from the light source.

4. The display unit as claimed in claim 1, wherein the light emitted by the light source is directed obliquely upward by the optical conductor.

5. A display unit, in particular for a motor vehicle, having a light source radiating light into an optical conductor, in particular for backlighting of a transparent dial, wherein the optical conductor is arranged substantially in a plane inclined with respect to the dial, the light source shining light into a section of the optical conductor inclined away from the dial, and wherein the optical conductor has at least one boundary surface which is parallel to the dial and runs radially relative to an axis of the dial and has an altered transmission.

6. The display unit as claimed in claim 5, wherein the optical conductor has a first section located at the light source and a second section located at the dial, and the optical conductor has a cross-sectional surface decreasing from the first section of the optical conductor to the second section of the optical conductor.

7. The display unit as claimed in claim 5, wherein the optical conductor has a first section located at the light source and a second section located at the dial, and the optical conductor bears against the dial with its second section inclined away from the light source.

8. The display unit as claimed in claim 5, wherein the light emitted by the light source is directed obliquely upward by the optical conductor.

9. A display unit, in particular for a motor vehicle, having a light source radiating light into an optical conductor, in particular for backlighting of a transparent dial, wherein the optical conductor is arranged substantially in a plane inclined with respect to the dial, the light source shining light into a section of the optical conductor inclined away from the dial, and wherein the optical conductor runs approximately helically from a plane set back from the dial to a plane of the dial.

10. The display unit as claimed in claim 9, wherein the optical conductor has a first section located at the light source and a second section located at the dial, and the optical conductor has a cross-sectional surface decreasing from the first section of the optical conductor to the second section of the optical conductor.

11. The display unit as claimed in claim 5, wherein the optical conductor has a first section located at the light source and a second section located at the dial, and the optical conductor bears against the dial with its second section inclined away from the light source.

12. The display unit as claimed in claim 9, wherein the light emitted by the light source is directed obliquely upward by the optical conductor.

13. A display unit, in particular for a motor vehicle, having a light source radiating light into an optical conductor, in particular for backlighting of a transparent dial, the light source being spaced apart from the dial, the optical conductor having a first section located at the light source and a second section located at the dial, wherein the optical conductor comprises a third section inclined with respect to the dial and extending from the first section to the second section, the light source shining light into the first section of the optical conductor, wherein the light source is arranged on a printed circuit board together with the first section of the optical conductor, said first section being inclined toward the light source.

14. The display unit as claimed in claim 13, wherein an area of the printed circuit board spanned by the optical conductor is provided for arrangement of further electric components.

15. The display unit as claimed in claim 13, wherein the optical conductor has a cross-sectional surface decreasing from the first section of the optical conductor to the second section of the optical conductor.

16. The display unit as claimed in claim 13, wherein the optical conductor bears against the dial with its second section inclined away from the light source.

17. The display unit as claimed in claim 13, wherein the light emitted by the light source is directed obliquely upward by the optical conductor.

18. A display unit, in particular for a motor vehicle, having a light source radiating light into an optical conductor, in particular for backlighting of a transparent dial, wherein the optical conductor is arranged substantially in a plane inclined with respect to the dial, the light source shining light into a section of the optical conductor inclined away from the dial, the display unit further comprising a second source of light, wherein the optical conductor has a middle section inclined toward the dial and first and second end sections positioned on either side of said middle section, each of said first and second end sections being inclined away from the dial and extending to respective ones of the two light sources.

19. The display unit as claimed in claim 18, wherein the two light sources are of different color.

20. A display unit, in particular for a motor vehicle, having a light source radiating light into an optical conductor, in particular for backlighting of a transparent dial, the light source being spaced apart from the dial, the optical conductor having a first section located at the light source and a second section located at the dial, wherein the optical conductor comprises a third section inclined with respect to the dial and extending from the first section to the second section, the light source shining light into the first section of the optical conductor, wherein the optical conductor is provided with a reflecting element on an outer surface averted from the dial.

21. The display unit as claimed in claim 20, wherein the optical conductor has a cross-sectional surface decreasing from the first section of the optical conductor to the second section of the optical conductor.

22. The display unit as claimed in claim 20, wherein the optical conductor bears against the dial with its second section inclined away from the light source.

23. The display unit as claimed in claim 20, wherein the light emitted by the light source is directed obliquely upward by the optical conductor.

24. A display unit, in particular for a motor vehicle, having a light source radiating light into an optical conductor, in particular for backlighting of a transparent dial, the light source being spaced apart from the dial, the optical conductor having a first section located at the light source and a second section located at the dial, wherein the optical conductor comprises a third section inclinded with respect to the dial and extending from the first section to the second section, the light source shining light into the first section of the optical conductor, wherein the light source is a light-emitting diode (LED).

25. The display unit as claimed in claim 24, wherein the optical conductor has a cross-sectional surface decreasing from the first section of the optical conductor to the second section of the optical conductor.

26. The display unit as claimed in claim 24, wherein the optical conductor bears against the dial with its second section inclined away from the light source.

27. The display unit as claimed in claim 24, wherein the light emitted by the light source is directed obliquely upward by the optical conductor.

28. A display unit, in particular for a motor vehicle, having a light source radiating light into an optical conductor, in particular for backlighting of a transparent dial, the light source being spaced apart from the dial, the optical conductor having a first section located at the light source and a second section located at the dial, wherein the optical conductor comprises a third section inclined with respect to the dial and extending from the first section to the second section, the light source shining light into the first section of the optical conductor, wherein the light source comprises a light emitting diode (LED) which is a component (SMD) which is surface-mountable on a printed circuit board.

29. The display unit as claimed in claim 28, wherein the optical conductor has a cross-sectional surface decreasing from the first section of the optical conductor to the second section of the optical conductor.

30. The display unit as claimed in claim 28, wherein the optical conductor bears against the dial with its second section inclined away from the light source.

31. The display unit as claimed in claim 28, wherein the light emitted by the light source is directed obliquely upward by the optical conductor.

32. A display unit, in particular for a motor vehicle, having a light source radiating light into an optical conductor, in particular for backlighting of a transparent dial, the light source being spaced apart from the dial, the optical conductor having a first section located at the light source and a second section located at the dial, wherein the optical conductor comprises a third section inclined with respect to the dial and extending from the first section to the second section, the light source shining light into the first section of the optical conductor, wherein the dial and a liquid crystal display (LCD) arranged approximately in a plane of the dial are lightable simultaneously by means of the optical conductor.

33. The display unit as claimed in claim 32, wherein the optical conductor has a cross-sectional surface decreasing from the first section of the optical conductor to the second section of the optical conductor.

34. The display unit as claimed in claim 32, wherein the optical conductor bears against the dial with its second section inclined away from the light source.

35. The display unit as claimed in claim 32, wherein the light emitted by the light source is directed obliquely upward by the optical conductor.

* * * * *